United States Patent
Wagner

(10) Patent No.: US 12,551,853 B2
(45) Date of Patent: Feb. 17, 2026

(54) SPINNERET

(71) Applicant: GAMBRO LUNDIA AB, Lund (SE)

(72) Inventor: Steffen Wagner, Meßstetten (DE)

(73) Assignee: GAMBRO LUNDIA AB, Lund (SE)

( * ) Notice: Subject to any disclaimer, the term of this patent is extended or adjusted under 35 U.S.C. 154(b) by 264 days.

(21) Appl. No.: 18/245,556

(22) PCT Filed: Sep. 21, 2021

(86) PCT No.: PCT/EP2021/075924
§ 371 (c)(1),
(2) Date: Mar. 16, 2023

(87) PCT Pub. No.: WO2022/058611
PCT Pub. Date: Mar. 24, 2022

(65) Prior Publication Data
US 2023/0364563 A1    Nov. 16, 2023

(30) Foreign Application Priority Data
Sep. 21, 2020  (EP) ..................... 20197240

(51) Int. Cl.
*B01D 69/08* (2006.01)
*B01D 71/44* (2006.01)
*B01D 71/68* (2006.01)

(52) U.S. Cl.
CPC ......... *B01D 69/085* (2013.01); *B01D 69/088* (2013.01); *B01D 71/441* (2022.08); *B01D 71/68* (2013.01)

(58) Field of Classification Search
None
See application file for complete search history.

(56) References Cited

U.S. PATENT DOCUMENTS

| 2,964,288 A | 12/1960 | Holmes et al. | |
| 4,634,434 A | 1/1987 | Marino et al. | |
| 2005/0110185 A1* | 5/2005 | Cook | D01D 4/02 425/382.2 |
| 2016/0279579 A1 | 9/2016 | Fujiki et al. | |

FOREIGN PATENT DOCUMENTS

| CN | 102266726 B | * 11/2012 | ............. B01D 69/08 |
| CN | 111519351 A | * 8/2020 | |
| EP | 3147024 | 3/2017 | |
| EP | 3657056 | 5/2020 | |

OTHER PUBLICATIONS

PCT Search Report and Written Opinion prepared for PCT Application No. PCT/EP2021/075924, completed Dec. 15, 2021.

* cited by examiner

Primary Examiner — Farah Taufiq
(74) Attorney, Agent, or Firm — Barnes & Thornburg LLP

(57) ABSTRACT

The present disclosure relates to a spinneret for producing hollow fiber membranes in a phase inversion process.

15 Claims, 3 Drawing Sheets

SPINNERET

CROSS-REFERENCE TO RELATED APPLICATIONS

This application is a national stage entry under 35 U.S.C. § 371(b) of PCT International Application No. PCT/EP2021/075924, filed Sep. 21, 2021, which claims the benefit of European Patent Application Serial No. 20197240.3, filed on Sep. 21, 2020, the entire disclosures of both of which are incorporated herein by reference.

TECHNICAL FIELD

The present disclosure relates to a spinneret for producing hollow fiber membranes in a phase inversion process.

BACKGROUND OF THE INVENTION

Semipermeable hollow fiber membranes for application in medical devices, e.g., capillary dialyzers and capillary filters, are mostly manufactured using a phase inversion process. Spinnerets having a nozzle with two concentric orifices, an outer ring slit and a central bore, are commonly used. A polymer solution is extruded through the outer ring slit of the nozzle into a precipitation bath, and simultaneously a center fluid is extruded through the inner bore of the nozzle.

The exact volume flow of center fluid through the nozzle is important in order to produce hollow fibers with the desired dimensions. The center fluid is provided to the spinneret at a certain pressure. In order to precisely adjust the center flow, a throttle generating a pressure increase is provided in the liquid flow path. The throttle serves as a flow regulator. Long tubes having a length of up to 100 mm are commonly used as throttle. The pressure increase in the liquid flow is set via the inside diameter and the length of the tube. The tube is cut to the length required for the desired pressure increase. The pressure increase and the associated flow metering cannot be changed after cutting, and the tube has to be housed in a container to protect it from mechanical damage.

It is an objective of the present disclosure to provide a spinneret which allows for a precise control of the volume flow of a center fluid through the spinneret and has a compact design.

EP 3 147 024 A1 discloses a spinneret which comprises a first pathway through which a polymer solution is provided, a second pathway through which a sheath liquid is provided, and a third pathway through which a core gas stream is provided.

US 2016/279579 A1 discloses a hollow fiber membrane-spinning nozzle including a resin flow channel through which a membrane-forming resin solution flows, the resin flow channel includes a liquid storage section that stores the membrane-forming resin solution and a shaping section that shapes the membrane-forming resin solution in a cylindrical shape and satisfies at least one of conditions (a) to (c): (a) the resin flow channel is disposed to cause the membrane-forming resin solution to branch and merge; (b) a delay means for delaying the flow of the membrane-forming resin solution is disposed in the resin flow channel; and (c) the liquid storage section or the shaping section includes branching and merging means for the membrane-forming resin solution therein.

EP 3 657 056 A1 discloses a differential pressure loss valve comprising a valve housing that incorporates: a sleeve that incorporates a continuous cylindrical helical thread formed in the inner surface thereof; and a cylindrical carrier incorporating a cylindrical helical thread formed in the outer surface thereof. When the channel carrier is positioned within the sleeve a portion of the sleeve cylindrical thread integrates with the channel carrier cylindrical helical thread, and a composite channel is formed therebetween.

U.S. Pat. No. 4,634,434 A1 discloses a flow regulator for use in medical apparatus for adjusting the flow of fluid in which there is a valve body with a valve member having a helical flow passage through which the fluid must flow. In order to facilitate quick adjustment of the fluid, the pitch and depth of the groove both progressively change from one end of the flow regulating device to the other, the depth of the groove becoming less as the pitch of the groove becomes finer. The valve member is longitudinally movable with respect to the valve body, and provision is made for adjusting the longitudinal position either by rotation of a threaded valve stem or by longitudinal movement of the valve stem to quickly adjust the flow rate. The helical groove may be either rectangular in cross-section, or V-shaped in cross-section. Suitable means are provided for sealing against leakage through the valve adjusting means.

U.S. Pat. No. 2,964,288 A1 discloses a metering valve comprising an internally cylindrical body, a screw thread in the body, an axial inlet at one end of the body, a first valve seat surrounding the inlet, a lateral outlet in the body spaced from the inlet, a valve spindle threadedly received in the body through the other end thereof, a-second seat at one end of the spindle for cooperation with the first seat, the spindle having an annular recess at its end immediately adjacent the second seat, a smooth cylindrical surface on the spindle fitting closely within the screw thread in the body. The surface extends from the recess at least as far as the outlet when the seats are in engagement with each other to define a helical path between the inlet and the outlet, and means to rotate the spindle to adjust the length of the helical path.

SUMMARY OF THE INVENTION

A spinneret core is provided that allows for a precise control of the volume flow of a center fluid through the spinneret core. The spinneret core can replace the core in conventional spinnerets and saves installation space otherwise required for a center fluid flow control unit.

SHORT DESCRIPTION OF THE DRAWINGS

DETAILED DESCRIPTION

Figure 1:
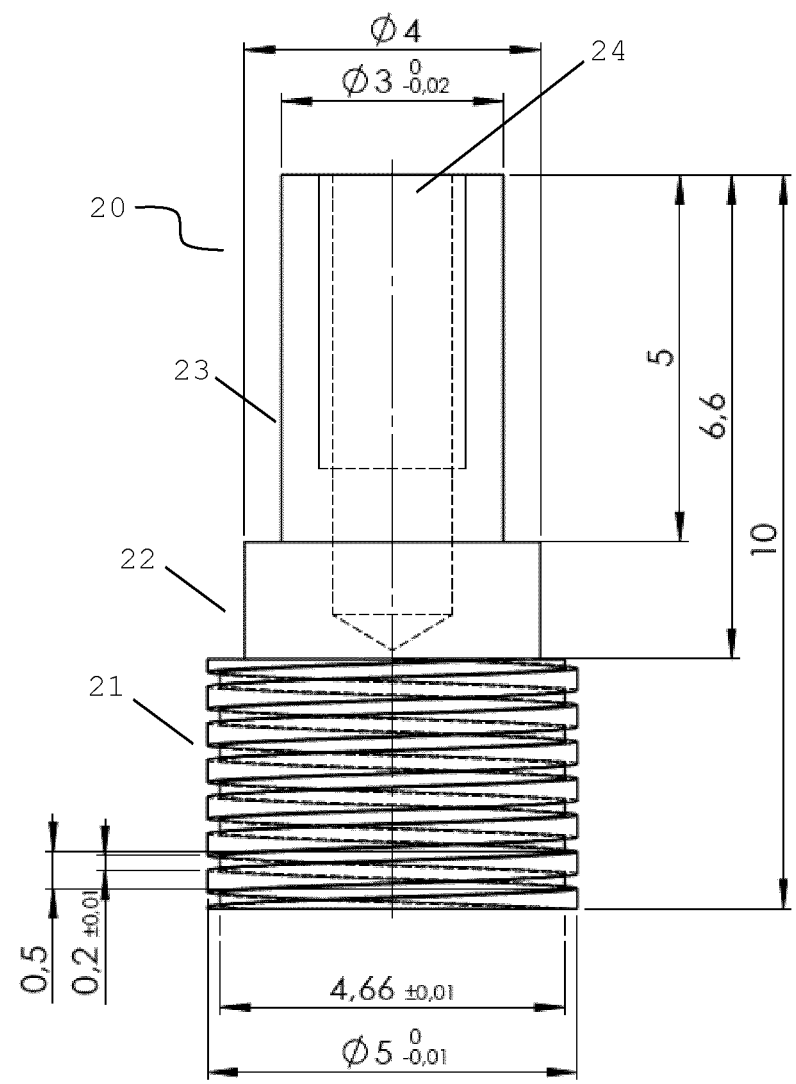
FIG. 1 is a longitudinal sectional view of an embodiment of the capillary insert used in the spinneret of the present disclosure.

The present disclosure provides a spinneret core that allows for a precise control of the volume flow of a center fluid through the spinneret core. The spinneret core can replace the core in conventional spinnerets and saves installation space otherwise required for a center fluid flow control unit. The present disclosure also provides a spinneret for the production of hollow fiber membranes which encompasses the spinneret core.

The spinneret of the present disclosure is comprised of two separate building blocks, a spinneret body and a spinneret core, which are assembled to form the spinneret. The spinneret body features an orifice in its upper side opening into a cavity, into which the second building block is inserted. The spinneret thus comprises a spinneret body and at least one spinneret core of the present disclosure arranged in a corresponding cavity of the spinneret body. In one embodiment, the spinneret is a twin spinneret, i.e., the spinneret body features two cavities for a spinneret core.

The first building block, the spinneret body, defines an outer wall of a compartment for a polymer solution and an outer wall of a ring slit of a nozzle of the spinneret located in the bottom face of the spinneret body. The spinneret body features a tubular duct for a polymer solution which connects to a compartment for a polymer solution in the spinneret defined by the inner surface of the cavity of the spinneret body and the outer surface of the spinneret core, and a tubular duct for a center fluid which connects to a corresponding feed port for a center fluid in the spinneret core. In the embodiment wherein the spinneret body features two cavities for a spinneret core, the cavities are connected by a further duct for a polymer fluid, and the duct for a center fluid connects to the corresponding feed ports of both spinneret cores.

The spinneret of the present disclosure features at least one nozzle in its bottom, the nozzle having two concentric orifices, an outer ring slit and a central orifice. The outer ring slit of the nozzle is connected to a compartment for a polymer solution in the spinneret, the central orifice of the nozzle is connected to a chamber for a center fluid in the spinneret core via a capillary.

The second building block, the spinneret core of the present disclosure, defines the inner wall of the compartment for a polymer solution and comprises a seat for a capillary insert, a feed port for a center fluid connected to a lateral opening of the seat, a chamber for a center fluid located below the seat, a capillary in fluid communication with the chamber and located at the base of the chamber, the seat being in fluid communication with the feed port and the chamber. A capillary insert comprising a threaded section at its lower end is arranged in the seat. The outer diameter of the threaded section matches the inner diameter of the seat and the thread of the threaded section and the inner wall of the seat together define a spiral capillary. The capillary insert is vertically moveable in the seat by an actuator. In one embodiment, the spinneret core has an axially symmetric shape.

The chamber for a center fluid is connected to a capillary which extends to the nozzle in the spinneret body, when the spinneret is assembled. The capillary also defines an inner orifice and an inner wall of the ring slit of the nozzle of the spinneret. The orifice of the feed port for a center fluid is aligned with the tubular duct for a center fluid in the spinneret body and has the same inner diameter.

The spinneret of the present disclosure contains a feed port for a polymer solution. The feed port supplies the nozzle of the spinneret with polymer solution. The feed port is connected to a compartment for a polymer solution which is defined by the inner wall of the spinneret body and the outer surface of the spinneret core. This compartment for a polymer solution takes the form of a rotationally-symmetrical shell formed around the spinneret core, and is connected to the tubular duct for a polymer solution in the spinneret body.

The spinneret core features a seat for a capillary insert. The seat takes the form of a chamber with a circular cross section. The chamber is in fluid communication with the feed port for a center fluid and the chamber for a center fluid which is located below the seat. In one embodiment, the seat takes the form of a cylindrical chamber. In another embodiment, the seat comprises a cylindrical section in its upper part, and a conical section in its lower part. In a further embodiment, the seat comprises a cylindrical section in its upper part, and a funnel-shaped section in its lower part which opens into the chamber for a center fluid.

A capillary insert is present in the seat. In one embodiment, the capillary insert has a circular cross section. The capillary insert comprises a threaded section at its lower end. The outer diameter of the threaded section matches the inner diameter of the seat. The threaded section and the inner wall surface of the seat together define a spiral capillary. The effective length of the spiral capillary can be varied by raising or lowering the capillary insert within the seat. When the capillary insert is moved upwards, the effective length of the spiral capillary decreases, resulting in smaller liquid pressure increase. When the capillary insert is moved downwards, the effective length of the spiral capillary increases, resulting in larger liquid pressure increase. When the capillary insert is in a position where the liquid enters the threaded section at its topmost turn, the effective length of the spiral capillary and the pressure increase become maximal. The length of the threaded section of the capillary insert is equal to or smaller than the distance from the base of the cylindrical section of the seat to the orifice of the feed port for a center fluid. In its lowest position within the seat, the capillary insert closes off the liquid flow through the spinneret core, as the fluid can no longer enter the thread of the capillary insert.

The vertical movement of the capillary insert within the seat is caused by a suitable actuator. The actuator is selected from hydraulic, pneumatic, electric, magnetic, thermal, and mechanical actuators. Examples include linear actuators, such as a plunger or piston, and screw-based actuators such as power-screws, ball screws, or roller screws.

In one embodiment, the part of the capillary insert above the threaded section is held by a threaded sleeve, i.e., a sleeve featuring a thread on its outer surface. The threaded sleeve is arranged within a corresponding seat provided in the spinneret core. The seat for the threaded sleeve is located above the seat for the capillary insert. The seat for the threaded sleeve features a thread on its inner wall surface. The thread is configured to interact with the thread on the outer surface of the threaded sleeve. By rotating the threaded sleeve, the capillary insert can be moved up or down in the seat, thus changing the effective length of the spiral capillary formed by the thread on the capillary insert and the inner wall surface of the seat for the capillary insert.

In one embodiment, the threaded sleeve is comprised of a plastic material. The plastic material preferably is resistant to the center fluid. In one embodiment, the plastic material is polyoxymethylene (POM). The plastic material provides a certain flexibility to the part, facilitating interaction with the capillary insert and the thread provided on the inner wall surface of the spinneret core body. The spinneret core body, the capillary insert, and the spinneret body generally are comprised of metal, e.g., stainless steel.

In one embodiment, the threaded sleeve features a central bore extending along its longitudinal axis, and the capillary insert is held within the threaded sleeve by a fastening element extending through the threaded sleeve and into the capillary insert. In one embodiment, the fastening element is a bolt or a screw. In one embodiment, a threaded bore is provided in the shaft of the capillary insert, along its central longitudinal axis.

In one embodiment, the shaft of the capillary insert, i.e., the part above the threaded section, has the same outer diameter as the outer diameter of the threaded section. In another embodiment, the outer diameter of the shaft is smaller than the outer diameter of the threaded section. In a further embodiment, the shaft comprises a first cylindrical section adjacent to the threaded section and a second cylindrical section adjacent to the first cylindrical section. The second cylindrical section has a diameter which is smaller than the diameter of the first cylindrical section, so that a circumferential ledge is formed on the topside of the first cylindrical section, at the bottom of the second cylindrical section. The ledge can be used to support the threaded sleeve and to lock the fastening element fastening the capillary insert to the threaded sleeve.

The spinneret core of the present disclosure significantly reduces space requirements for spinnerets. It allows for individual adjustment of the center fluid pressure in a spinneret and thus of the flow rate of the center fluid through the spinneret. The spinneret core is exchangeable and can be used in different spinnerets. Center fluid flow through a spinneret core can be calibrated before the spinneret core is installed in a spinneret, i.e., in a separate calibration device or calibration arrangement.

The present disclosure also provides a process for the production of hollow fiber membranes, comprising feeding a polymer solution to the feed port for a polymer solution of the spinneret of the present disclosure, simultaneously feeding a center solution to a feed port for a center fluid of the spinneret of the present disclosure, extruding the polymer solution through the outer ring slit of the nozzle of the spinneret of the present disclosure, and simultaneously extruding the center fluid through the central orifice of the nozzle of the spinneret of the present disclosure.

Suitable polymer solutions and suitable center fluids for the production of semipermeable hollow fiber membranes are well known in the art. For instance, a solution comprising 1) at least one polysulfone, polyethersulfone, or polyarylethersulfone, and 2) at least one polyvinylpyrrolidone may be used as the polymer solution. In one embodiment, the at least one polysulfone, polyethersulfone, or polyarylethersulfone, and the at least one polyvinylpyrrolidone are dissolved in 3) a mixture of N-methyl-2-pyrrolidone (NMP) and water. In one embodiment, a mixture of water and NMP is used as the center fluid.

The spinneret core and the spinneret of the present disclosure will now be further explained by referring to the accompanying figures.

FIG. 1 shows a longitudinal sectional view of an exemplary embodiment of a capillary insert 20 used in the spinneret core of the present disclosure. The capillary insert 20 comprises a threaded section 21 at its lower end. The threaded section 21 provides a spiral capillary when inserted into a corresponding spinneret core.

In the embodiment shown, a first cylindrical section 22 and a second cylindrical section 23 are located above the threaded section 21. The first cylindrical section 22 has a diameter which is smaller than the outer diameter of the threaded section 21, and the second cylindrical section 23 has a diameter which is smaller than the outer diameter of the first cylindrical section 22, so that a circumferential ledge is formed on the topside of the first cylindrical section 22, at the bottom of the second cylindrical section 23.

In other embodiments, the diameter of the first section 22 and the second section 23 is the same, i.e., the capillary insert 20 comprises a threaded section 21 in its lower part and a cylindrical section above the threaded section 21. In a further embodiment, the outer diameter of the threaded section 21 and the first cylindrical section 22 are identical.

In the embodiment shown, the capillary insert 20 has an overall length of 10 mm, the threaded section having a length of 3.4 mm, the first cylindrical section 22 having a length of 1.6 mm, the second cylindrical section 23 having a length of 5 mm. In the embodiment shown, the threaded section has an outer diameter of 5 mm, the first cylindrical section 22 has an outer diameter of 4 mm, and the second cylindrical section 23 has an outer diameter of 3 mm. The pitch of the thread in the threaded section 21 is 0.5 mm, the height of the thread is 0.2 mm, its depth is 0.17 mm. The capillary insert 20 is configured to operate at a pressure of 2 bar(g) and provide a flow rate of 4 ml/min with an accuracy of ±0.5 ml/min.

In the embodiment shown, a central threaded bore 24 is provided in the second cylindrical section 23. The bore extends through the second cylindrical section 23 into the first cylindrical section 22.

Figure 2:
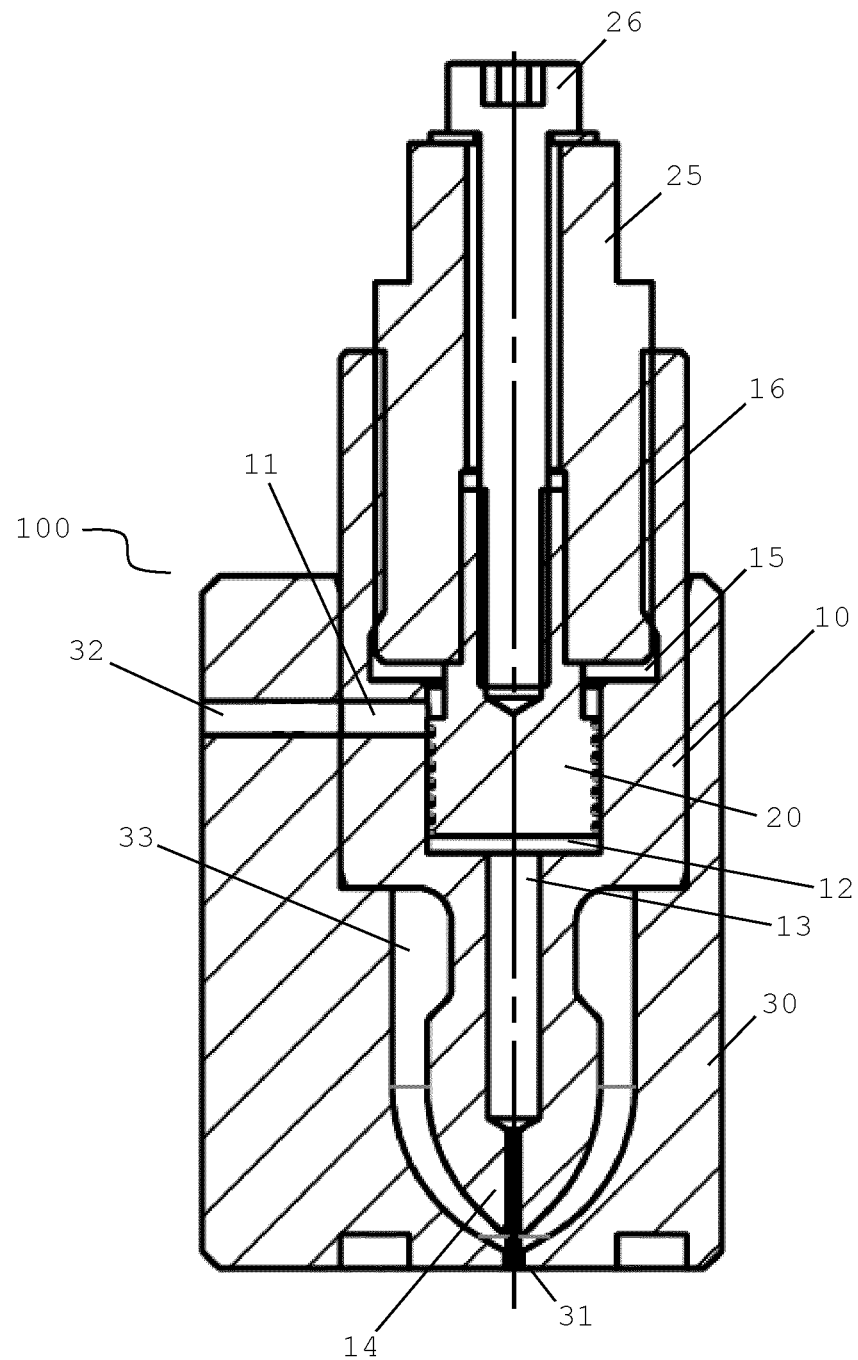
FIG. 2 is a longitudinal sectional view of a spinneret comprising an embodiment of the spinneret core of the present disclosure.

FIG. 2 is a longitudinal sectional view of a spinneret 100 comprising an embodiment of the spinneret core 10 of the present disclosure. The spinneret core 10 has been inserted into a cavity 33 of a spinneret body 30. The spinneret body 30 features a nozzle 31 at its bottom, which comprises a circular orifice at the base of cavity 33. The spinneret body features a duct (not shown) for polymer solution which is in fluid communication with the cavity 33. A duct 32 for a center fluid also is provided in the spinneret body 30. The duct 32 is connected to a corresponding feed port 11 for center fluid in the spinneret core 10. The spinneret core 10 features a seat 12 for a capillary insert 20. The seat 12 is in fluid communication with the feed port 11 and a center fluid chamber 13 located below the seat 12. At the base of the center fluid chamber 13, a capillary 14 is located which extends into the nozzle 31 and defines the inner orifice of the nozzle 31 and the inner boundary of the outer ring slit of the nozzle 31.

A capillary insert 20 as shown in FIG. 1 is located within the seat 12. A screw 26 locks the capillary insert 20 within a threaded sleeve 25. The threaded sleeve 25 is located within a corresponding seat 15 provided in the spinneret core 10. The seat 15 features a thread 16 on its inner wall surface. The thread 16 is configured to interact with the thread on the outer surface of the threaded sleeve 25. By rotating the threaded sleeve 25, the capillary insert 20 can be moved up or down in the seat 12, thus changing the effective length of the spiral capillary formed by the thread on the capillary insert 20 and the inner wall surface of the seat 12.

Figure 3:
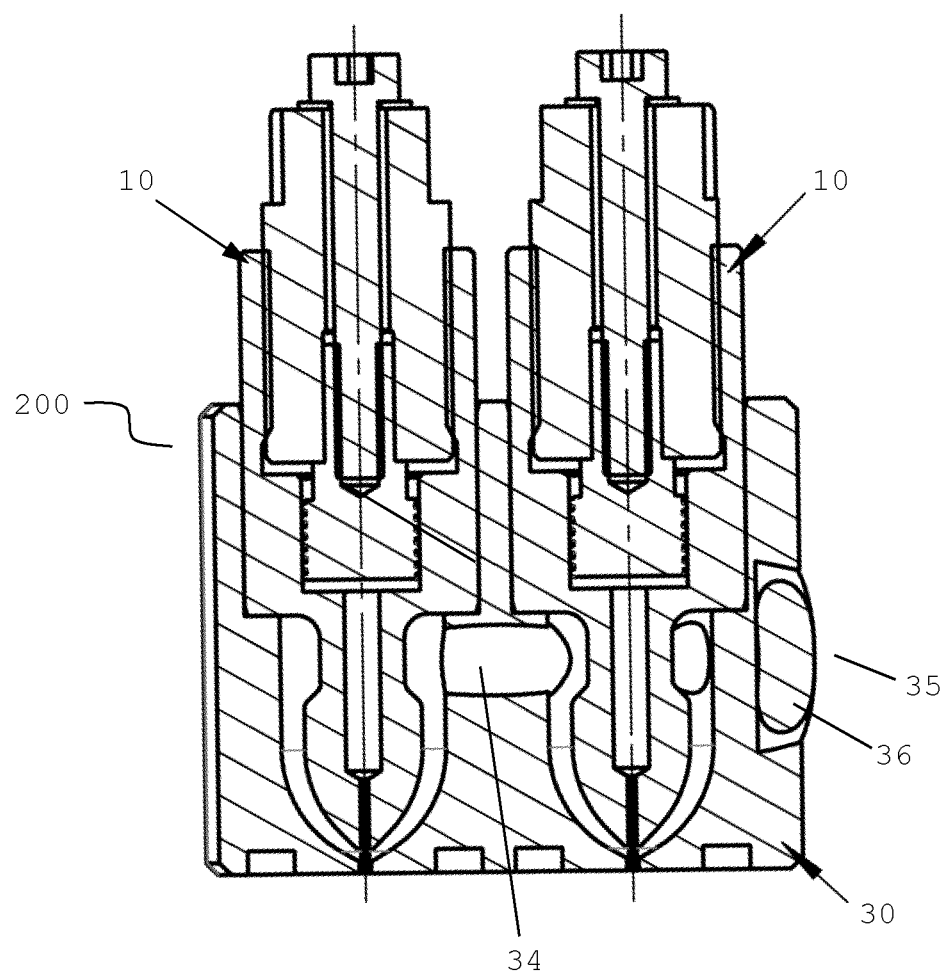
FIG. 3 is a longitudinal sectional view of a twin spinneret comprising embodiments of the spinneret core of the present disclosure.

FIG. 3 is a longitudinal sectional view of a twin spinneret 200 comprising embodiments of the spinneret core 10 of the present disclosure. Two identical spinneret cores 10 have been inserted into two corresponding cavities of a twin spinneret body 30. The twin spinneret body 30 features a port 35 for a polymer solution provided by a feed line (not shown) and a polymer solution duct 34 connecting the two cavities of the twin spinneret body 30. A sealing ring 36 around the feed port 35 prevents leakage of the polymer solution when the twin spinneret 200 is operating.

LIST OF REFERENCE SIGNS 10 spinneret core
11 feed port for center fluid 12 seat for capillary insert
13 center fluid chamber
14 capillary
15 seat for threaded sleeve
16 thread
20 capillary insert
21 threaded section
22 first shaft section
23 second shaft section
24 threaded bore
25 threaded sleeve
26 screw
30 spinneret body
31 nozzle
32 center fluid duct
33 cavity
34 polymer solution duct
35 polymer solution port
36 sealing ring
100 spinneret
200 twin spinneret

The invention claimed is:

1. A spinneret core comprising a seat for a capillary insert, a feed port for a center fluid connected to a lateral opening of the seat, a chamber for a center fluid located below the seat, a capillary in fluid communication with the chamber and located at the base of the chamber; the seat being in fluid communication with the feed port and the chamber; and a capillary insert comprising a threaded section at its lower end arranged in the seat, the outer diameter of the threaded section matching the inner diameter of the seat and the thread of the threaded section and the inner wall of the seat together defining a spiral capillary, the capillary insert being vertically moveable in the seat by an actuator.

2. The spinneret core of claim 1, having an axially symmetric shape.

3. The spinneret core of claim 1, wherein the seat for the capillary insert takes the form of a cylindrical chamber.

4. The spinneret core of claim 1, wherein the seat for the capillary insert comprises a cylindrical section in its upper part and a funnel-shaped section in its lower part which opens into the chamber for a center fluid.

5. The spinneret core of claim 1, wherein the part of the capillary insert above the threaded section is held by a sleeve featuring a thread on its outer surface, the sleeve being arranged within a corresponding seat provided in the spinneret core and featuring a thread on its inner wall surface, the thread being configured to interact with the thread on the outer surface of the threaded sleeve.

6. The spinneret core of claim 5, wherein the sleeve is comprised of a plastic material.

7. The spinneret core of claim 5, wherein the sleeve comprises a central bore extending along its longitudinal axis, and the capillary insert is held within the threaded sleeve by a fastening element extending through the sleeve and into the capillary insert.

8. The spinneret core of claim 1, wherein the diameter of the shaft of the capillary insert is the same as the outer diameter of the threaded section.

9. The spinneret core of claim 1, wherein the diameter of the shaft of the capillary insert is smaller than the outer diameter of the threaded section.

10. A spinneret core comprising a seat for a capillary insert, a feed port for a center fluid connected to a lateral opening of the seat, a chamber for a center fluid located below the seat, a capillary in fluid communication with the chamber and located at the base of the chamber; the seat being in fluid communication with the feed port and the chamber; and a capillary insert comprising a threaded section at its lower end arranged in the seat, the outer diameter of the threaded section matching the inner diameter of the seat and the thread of the threaded section and the inner wall of the seat together defining a spiral capillary, the capillary insert being vertically moveable in the seat by an actuator, wherein the shaft of the capillary insert comprises a first cylindrical section adjacent to the threaded section and a second cylindrical section adjacent to the first cylindrical section, the second cylindrical section having a diameter which is smaller than the diameter of the first cylindrical section, so that a circumferential ledge is formed on the topside of the first cylindrical section, at the bottom of the second cylindrical section.

11. The spinneret core of claim 10, having an axially symmetric shape.

12. The spinneret core of claim 10, wherein the part of the capillary insert above the threaded section is held by a sleeve featuring a thread on its outer surface, the sleeve being arranged within a corresponding seat provided in the spinneret core and featuring a thread on its inner wall surface, the thread being configured to interact with the thread on the outer surface of the threaded sleeve.

13. The spinneret core of claim 12, wherein the sleeve comprises a central bore extending along its longitudinal axis, and the capillary insert is held within the threaded sleeve by a fastening element extending through the sleeve and into the capillary insert.

14. The spinneret core of claim 10, wherein the diameter of the shaft of the capillary insert is the same as the outer diameter of the threaded section.

15. The spinneret core of claim 10, wherein the diameter of the shaft of the capillary insert is smaller than the outer diameter of the threaded section.

* * * * *